Jan. 6, 1925.
A. B. HOLSON
DRIVE
Filed May 15, 1924
1,521,812
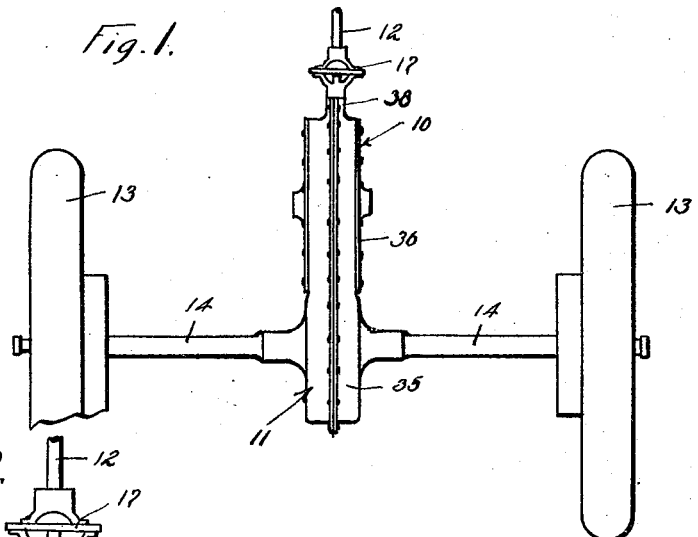
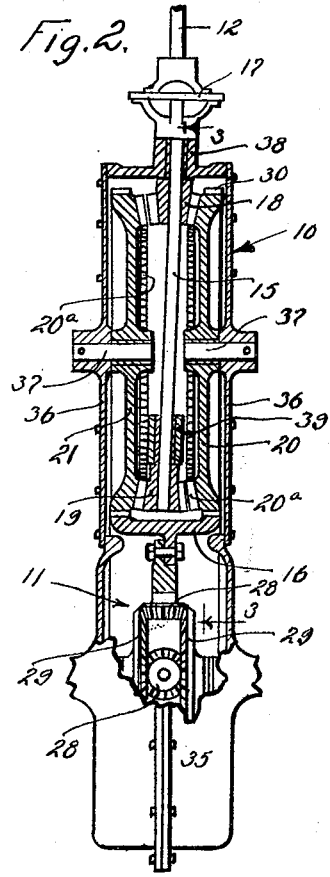
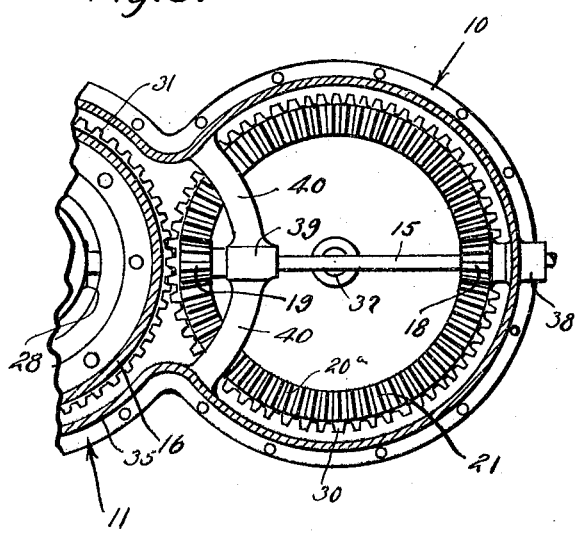
Inventor
Albert B. Holson
by W. N. Malwell
his Attorney Patented Jan. 6, 1925.

1,521,812

UNITED STATES PATENT OFFICE.

ALBERT B. HOLSON, OF LOS ANGELES, CALIFORNIA.

DRIVE.

Application filed May 15, 1924. Serial No. 713,450.

*To all whom it may concern:*

Be it known that I, ALBERT B. HOLSON, a citizen of the United States, and a resident of Los Angeles, State of California, have invented new and useful Improvements in Drives, of which the following is a specification.

This invention relates to a drive particularly useful for motor vehicles.

It is an object of this invention to provide a drive, which is simple, effective and reliable.

Another object of this invention is to provide a drive of the character herein described, which is durable and suitable for heavy duty.

Another object of this invention is to provide a drive of the character herein described, which is inexpensive of construction and in which the parts are accessible for repair or replacement.

The objects and features of this invention will be best and more fully understood from the following detailed description of a typical form and application of the invention throughout which description reference is had to the accompanying drawings in which—

Fig. 1 is a plan view of the rear axle assembly of a motor vehicle, the assembly including the drive mechanism provided by this invention.

Fig. 2 is an enlarged horizontal detail sectional view of the drive provided by this invention, and Fig. 3 is a detail sectional view taken as indicated by line 3—3 on Fig. 2.

The drive provided by this invention is particularly applicable to motor vehicles so therefore I have herein disclosed it in such situation; it being understood, of course, that such disclosure is not to be considered as limiting the broader features of the invention to any specific use or application.

In the general arrangement illustrated in the drawings, the drive 10 provided by this invention is embodied in, or formed as a part of, the rear axle assembly of the vehicle, being formed as a unit with the differential 11. The drive 10 is arranged so that it comes between the propeller shaft 12 of the vehicle and the differential 11 of the axle assembly. The usual wheels 13 are provided at the ends of the axle and are driven from the differential mechanism 11 through suitable axle shafts carried in the usual axle housings 14.

The drive provided by this invention includes, generally, a drive shaft 15, a driven member 16, and a gear drive between the shaft 15 and the member 16. The shaft 15 is adapted to be driven by the propeller shaft 12. I have illustrated the propeller shaft 12 and drive shaft 15 connected by a suitable joint 17.

The gear drive between the shaft 15 and member 16 includes, generally, two pinions 18 and 19 on the shaft 15, two gear members 20 and 21 driven by the pinions 18 and 19, respectively, and a drive connection between the gear members 20 and 21 and the driven member 16. The pinions 18 and 19 are fixed in spaced relation on the shaft 15, and are of the same size. The gear members 20 and 21 are comparatively large gears provided on their inner or adjacent faces with gear teeth 20$^a$, and are arranged at opposite sides of the shaft 15. The gear members are tilted or arranged angularly with relation to the shaft so that the teeth 20$^a$ on the gear member 20 mesh with the pinion 18 and clear the pinion 19 while the teeth on the gear member 21 mesh with the pinion 19 and clear the pinion 18. The gear members are coaxial and are of the same size so that they are driven at the same speed by the pinions. It is to be noted that the points of engagement between the gear members 20 and 21 are at opposite sides of the shaft 15, and at diametrically opposite points with relation to the axis of the gears so that the gear members are driven in the same direction as well as at the same speed. In practice the angularity between the shaft 15 and gear members 20 and 21 is made sufficient to cause the pinions and gear teeth 20$^a$ to properly cooperate and clear, and therefore does not throw the shaft 15 much out of alignment with the propeller shaft 12.

In the arrangement illustrated in the drawings the member 16 is the drive member or element of the differential 11, and is in the form of a ring mounted for rotation about its central axis. The member 16 has mounted in it the differential pinions 28 which mesh with the gears 29 on the inner ends of the axle shafts. The drive between the gear members 20 and 21 and the member 16 is preferably a simple and direct drive had through gear teeth 30, provided on the peripheries of the gear members 20 and 21, meshing with gear teeth 31 provided on the periphery of the member 16. In this manner the power delivered to and distributed between the gear members 20 and 21 from the shaft 15 is delivered to the member 16 at a considerably reduced speed.

It will be apparent that the speed ratio between the shaft 15 and member 16 will depend upon the proportioning of the pinions 18 and 19, and gear members 20 and 21, and the proportioning of the gear members 20 and 21 with relation to the member 16.

The various parts of the drive 10 may be supported, mounted and housed in any suitable manner. It is preferred that the drive 10 be housed as a unit with the differential 11. In the drawings I have illustrated a single housing 35 for the differential and drive 10. At the drive the sides 36 of the housing are in the form of detachable plates slightly larger in diameter than the gears 20 and 21. The plates 36 carry trunnions 37, which extend into the housing to carry the gear members 20 and 21. The shaft 15 extends into the housing through a bearing 38, and its inner end is supported in the housing by a bearing 39 arranged between the gear members 20 and 21. The bearing 39 may be carried by suitable ribs 40 in the manner clearly illustrated in Fig. 3. The bearing 38 forms a support for the shaft 15 adjacent the pinion 18 while the bearing 39 forms a support for the shaft adjacent the pinion 19. With the arrangement just described the drive 10 is readily accessible as all parts of it can be reached by removal of the plates 36.

From the foregoing description it will be apparent that I have provided by my present invention an effective durable drive through which a substantial speed reduction can be obtained, and in which there is a minimum of wear and friction. It is to be particularly noted that the pinions balance the thrust on the drive shaft so that no thrust bearing is required on the drive shaft 15. Further, the driving strain is divided between the pinions making the drive particularly strong and durable, and not dependent upon the strength and durability of a single pinion as is the case of an ordinary drive.

Having described only a typical preferred form of my invention I do not wish to limit myself to the specific details hereinabove set forth but wish to reserve to myself any changes or variations that may appear to those skilled in the art or fall within the scope of the following claims.

Having described my invention, I claim:

1. A drive including, a drive shaft, two gears arranged at opposite sides of the shaft, pinions on the shaft, one meshing with one gear and the other meshing with the other gear, the points of engagement between the pinions and gears being at diametrically opposite points with relation to the gears, and a single member driven by the gears.

2. A drive including, a drive shaft, two gears arranged at opposite sides of the shaft, pinions on the shaft, one meshing with one gear and the other meshing with the other gear, the points of engagement between the pinions and gears being at diametrically opposite points with relation to the gears, a driven member having gear teeth on it, and gear teeth on the peripheries of the gear members meshing with the teeth on the driven member.

3. A drive including, a drive shaft, two pinions spaced on the shaft, two coaxial gears arranged at opposite sides of the shaft angularly with relation to the shaft so that one meshes with one of the pinions and the other meshes with the other pinion, and a single member driven by said gears.

4. A drive including, a drive shaft, two pinions spaced on the shaft, bearings for the shaft adjacent the pinions, two coaxial gears arranged at opposite sides of the shaft angularly with relation to the shaft so that one meshes with one of the pinions and the other meshes with the other pinion, and a single member driven by said gears.

5. A drive including, a housing having removable sides, a shaft, a bearing supported by the housing to carry the shaft, two spaced pinions on the shaft, two gears carried coaxially by the sides of the housing at opposite sides of the shaft and in angular relation to the shaft so that one meshes with one of the pinions and the other with the other pinion, and a single member driven by the gears.

6. A drive including a differential having a rotatable drive member with gear teeth on it, a drive shaft, two spaced pinions on the shaft, two coaxial gears arranged at opposite sides of the shaft angularly with relation to the shaft so that one meshes with one of the pinions and the other with the other pinion, and gear teeth on the gears meshing with the teeth on the drive member.

7. A drive including, a single housing having removable parts at opposite sides, a differential carried in the housing and including a rotatable drive member having gear teeth on its periphery, a drive shaft extending into the housing, two spaced pinions on the shaft, two gears carried by the removable parts of the housing at opposite sides of the shaft angularly with relation to the shaft so that one of them meshes with one pinion and the other with the other pinions, and gear teeth on the peripheries of the gears meshing with the gear teeth on the drive member.

8. A drive including, a differential having a drive member, a drive shaft, two gears arranged at opposite sides of the shaft, two pinions fixed on the shaft one meshing with one of the gears and the other meshing with the other gear, the points of engagement between the pinions and gears being diametrically opposite with relation to the gears, and a driving connection between the gears and said drive member.

In witness that I claim the foregoing I have hereunto subscribed my name this 10th day of May, 1924.

ALBERT B. HOLSON.

Witness:
WM. H. MAXWELL.